United States Patent
Gerstel et al.

(10) Patent No.: US 7,116,860 B1
(45) Date of Patent: Oct. 3, 2006

(54) COUPLER ADD/DROP NODE WDM NETWORK ARCHITECTURE WITH PERIODIC CLEANUP

(75) Inventors: Ornan Gerstel, Los Altos, CA (US); Valerio Viscardi, Paderno Dugnano (IT); Stefano Piciaccia, Milan (IT); Gianpaolo Barozzi, Cinisello Balsamo (IT)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 10/728,535

(22) Filed: Dec. 5, 2003

(51) Int. Cl.
*G02B 6/293* (2006.01)

(52) U.S. Cl. .......................... 385/24; 385/27

(58) Field of Classification Search .......... 385/24, 385/27
See application file for complete search history.

(56) References Cited

U.S. PATENT DOCUMENTS

| | | | |
|---|---|---|---|
| 5,426,297 A * | 6/1995 | Dunphy et al. ........ | 250/227.23 |
| 6,091,869 A * | 7/2000 | Sundelin ................ | 385/24 |
| 6,421,168 B1 | 7/2002 | Allan et al. ............ | 359/337 |
| 6,525,852 B1 | 2/2003 | Egnell .................... | 359/127 |
| 6,556,736 B1 | 4/2003 | Doerr et al. ........... | 385/14 |
| 6,559,989 B1 | 5/2003 | Kim et al. .............. | 359/139 |
| 6,574,192 B1 | 6/2003 | Egnell ..................... | 370/224 |
| 6,590,681 B1 | 7/2003 | Egnell et al. ........... | 359/127 |
| 6,646,789 B1 * | 11/2003 | Kelkar et al. .......... | 359/337.1 |
| 2001/0002150 A1 | 5/2001 | Frigo ....................... | 359/127 |
| 2001/0017958 A1 | 8/2001 | Solheim et al. ........ | 385/24 |
| 2003/0002104 A1 | 1/2003 | Caroli et al. ........... | 359/127 |
| 2003/0128984 A1 * | 7/2003 | Oberg et al. ........... | 398/83 |
| 2003/0223104 A1 | 12/2003 | Kinoshita et al. ...... | 359/333 |
| 2004/0008404 A1 | 1/2004 | Aoki et al. ............. | 359/334 |

* cited by examiner

*Primary Examiner*—Sarah Song
(74) *Attorney, Agent, or Firm*—Aka Chan LLP

(57) ABSTRACT

A efficient and inexpensive optical WDM network architecture with add and drop couplers. Add couplers and drop couplers connected to a network optical fiber with wavelength blocker units which filter out optical signals at selected wavelengths on the optical fiber. The wavelength blocker units are distributed among the add and drop couplers so that each segment of the optical fiber between pairs of neighboring wavelength blocker units has at least three add and drop couplers. More specifically, each segment has the following relationship:

$$\text{THRU+ADD+DROP+LOCAL} \leq \text{TOTAL}$$

where THRU is the number of channels passing through the segment; ADD is the number of channels added within the segment; DROP the number of channels dropped within the segment; LOCAL the number of channels confined within the segment; and TOTAL is the total capacity of the optical fiber.

12 Claims, 7 Drawing Sheets

COUPLER ADD/DROP NODE WDM NETWORK ARCHITECTURE WITH PERIODIC CLEANUP

BACKGROUND OF THE INVENTION

The present invention is related to optical network architecture and, more particularly, to the network architecture using simple coupler add/drop nodes and to devices for efficiently implementing such add/drop node network architecture.

Currently, a growing number of optical networks are WDM (Wavelength Division Multiplexing) or DWDM (Dense WDM) networks, as particularly defined by standards of the ITU (International Telecommunications Union). In the following description, WDM is used in the more general sense of networks in which optical wavelengths are used to define the network communication channels, unless a specific ITU-defined network is specifically described.

For networks with wavelength-defined communication channels, wavelength-selective switches are often used to direct optical signals along different paths of a network. However, such switches are expensive and are used mostly for the most heavily trafficked optical networks, such as the so-called "backbone" networks, which interconnect geographical regions of a country or countries themselves.

For optical networks where usage is less intensive, simpler add/drop nodes are often used. Such nodes typically have fixed wavelength, add/drop filters which drop signals at specific wavelengths at the node locations. The filters also allow signals at the specific wavelength to be added. However, these add/drop filters lack flexibility so that changes in network connections are difficult and expensive to make. A less common arrangement is the use of inexpensive couplers for the add and drop functions. However, while the coupler add/drop node offers the promise of network flexibility, some sort of wavelength blockers or filters are required to increase wavelength utilization in the network, which add to the costs of such add/drop nodes.

The present invention, on the other hand, offers flexibility at relatively low cost for networks with coupler add/drop nodes.

SUMMARY OF THE INVENTION

The present invention provides for an optical network comprising a optical fiber which carries light signals of a plurality of wavelengths, each wavelength defining a communication channel for the optical network; a plurality of add couplers connected to the optical fiber, each add coupler inserting light signals of at least one wavelength into the optical fiber; a plurality of drop couplers connected to the optical fiber, each drop coupler splitting the light signals of the plurality of wavelengths from the optical fiber; and a plurality of wavelength blocker units connected to the optical fiber, each wavelength blocker unit filtering out optical signals at selected wavelengths on the optical fiber and distributed among groups of the add and drop couplers so that each segment of the optical fiber between pairs of neighboring wavelength blocker units has at least three add and drop couplers. More specifically, each segment has the following relationship:

THRU+ADD+DROP+LOCAL≤TOTAL holding true, where THRU is the number of channels passing through the segment; ADD is the number of channels added within the segment; DROP the number of channels dropped within the segment; LOCAL the number of channels confined within the segment; and TOTAL is the total capacity of the optical fiber.

Optical amplifiers are typically used to boost signals in an optical fiber and the present invention also provides for the wavelength blocker units to be combined with the optical amplifiers distributed along the optical fiber.

The present invention also provides for the combination of an add coupler and a drop coupler in a single device having four terminals. The first and second terminals are connected to the optical fiber to provide an optical path therethrough, a third terminal provides an optical path for signals to be split (dropped) from the optical fiber, and a fourth terminal provides an optical path for signals to be added to said optical fiber.

For signals which are dropped from a network optical fiber, the present invention provides for a combination of a drop coupler (a coupler having a drop function) and a plurality of wavelength filters connected in a serial cascade to the drop coupler arranged so that for any pair of wavelength filters, a wavelength filter first receiving signals from the drop coupler diverts signals at one or more predetermined wavelengths to a first receiver and transmitting signals at wavelengths other than the one ore more predetermined wavelengths to a second wavelength receiver, the second wavelength receiver diverting the transmitted signals at at least one or more wavelengths to a second receiver. This combination is hitless so that more receivers can be added to receive signals through the drop coupler with interfering with the existing receivers.

DESCRIPTION OF SPECIFIC EMBODIMENTS

Figure 1A:
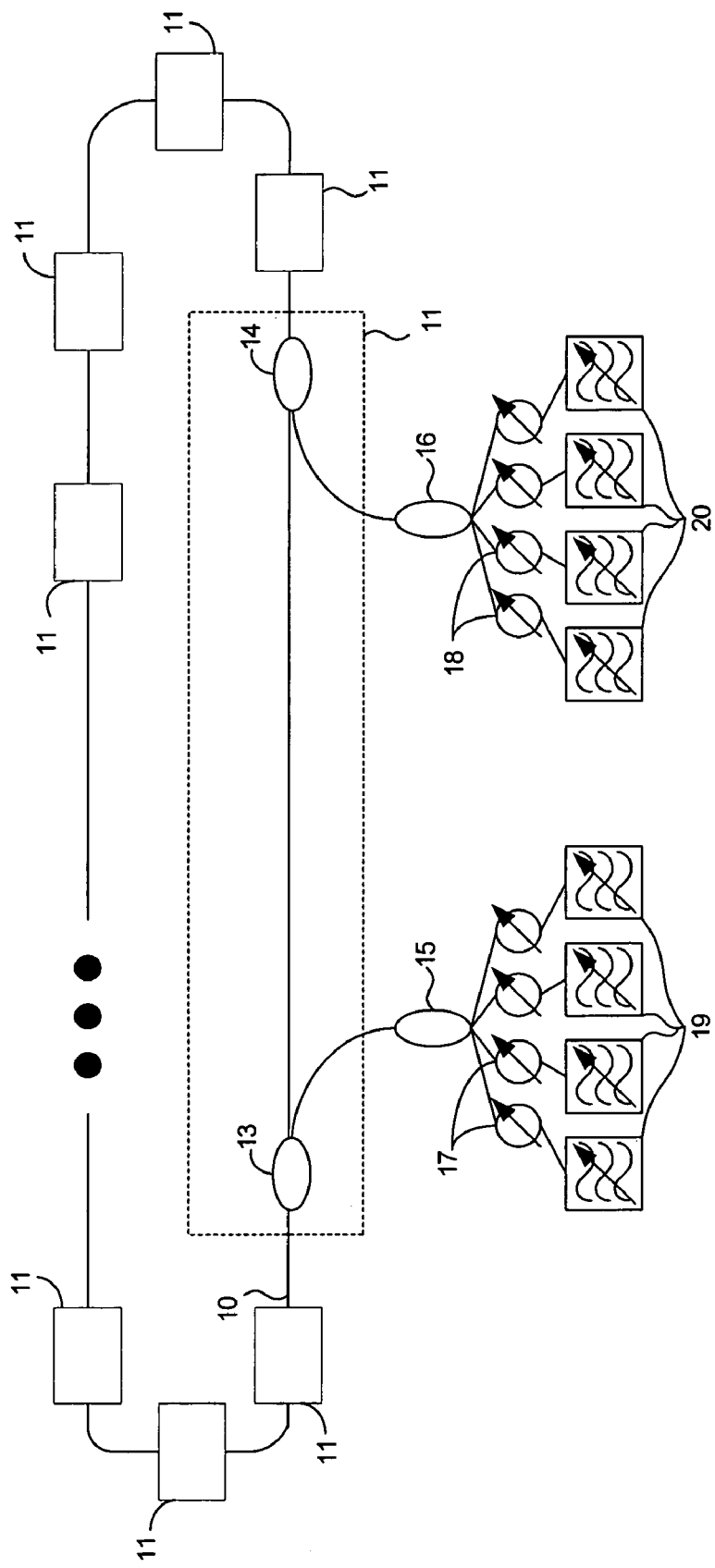
FIG. 1A illustrates the architecture of an optical loop network with coupler add/drop nodes.
Figure 1B:
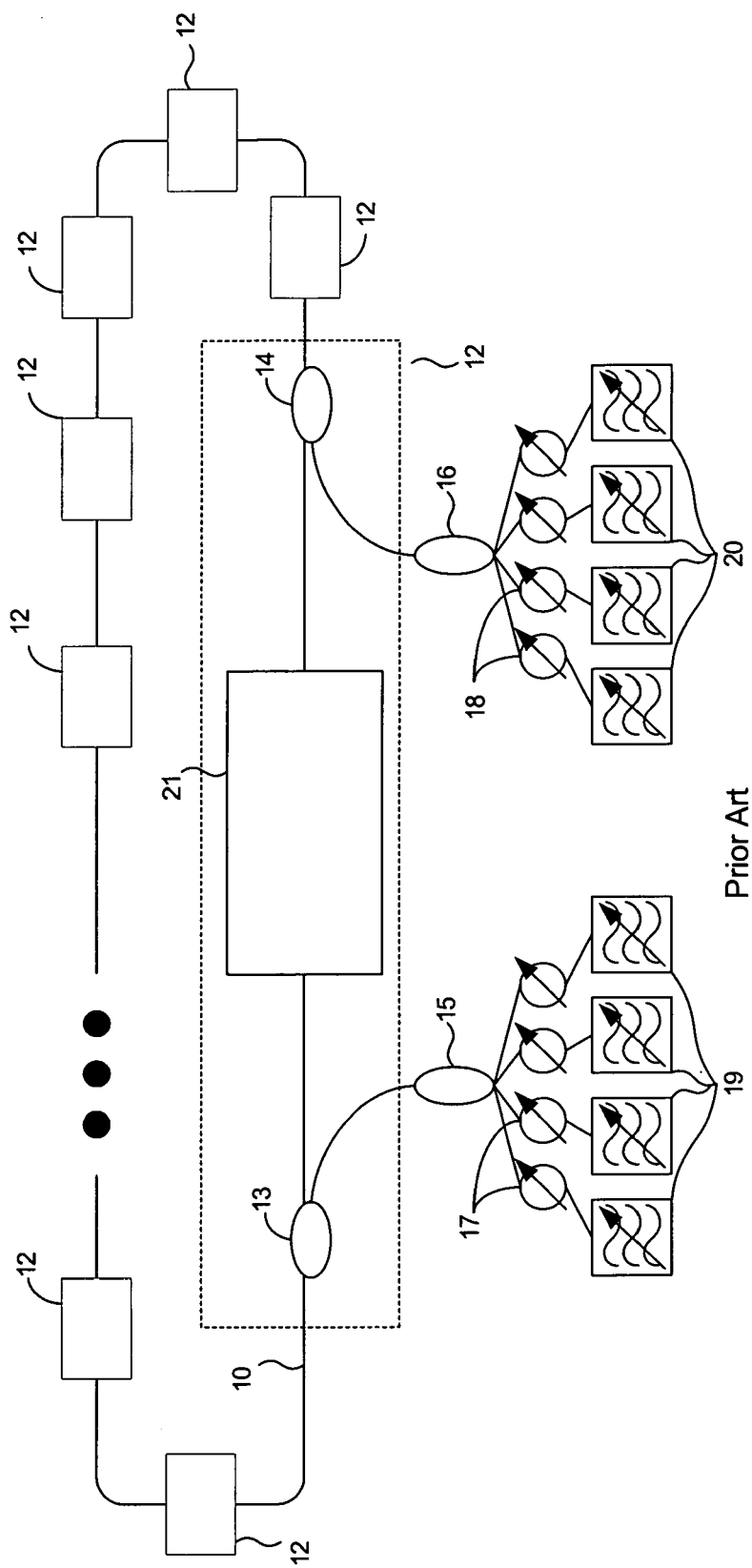
FIG. 1B illustrates the architecture of an optical loop network with coupler add/drop nodes having a wavelength blocker units.

FIGS. 1A and 1B illustrate the advantages and disadvantages of present optical networks with coupler add/drop nodes. For purposes of simplicity of description, while the exemplary loop networks of FIGS. 1A and 1B are bi-directional, only one direction of the loop networks is shown.

The architecture of an optical fiber loop network with coupler add/drop nodes 11 is shown in FIG. 1A. Each add/drop node 11 is simple, with couplers 13 and 14 by which optical signals are split from a loop fiber 10 (coupler 13) and inserted into the loop fiber (coupler 14). For the drop function the coupler 13 is connected to another coupler 15 which, in turn, divides the split-off optical signals into a plurality, in this example, four, of paths. Each path has a separate VOA (variable optical attenuator) 17 and a receiver 19. Each receiver 19 is sensitive to optical signals of a particular wavelength to form the receiving end of a communications channel in a fiber loop network.

For the add function the coupler 14 is, in turn, connected to a coupler 16 which, in turn, combines the optical signals from a plurality, again in this example, four, of optical paths. Each optical path has a transmitter 20, including a source of optical signals such as a laser diode, and a VOA 18 to control the strength of the signal onto the loop fiber 10. Each transmitter 20 sends optical signals at a particular wavelength to form the source of a communications channel in the fiber loop network.

Parenthetically, it should be noted that any optical loop network faces the problem of wavelength lasing, a condition in which some signals in the loop are amplified (by optical amplifiers not shown in the FIGS. 1A and 1B drawings) uncontrollably as they recirculate around the loop. This is prevented by opening the loop optically, either at the hub node, or by turning off the optical amplifiers of a section of the loop.

With the simple coupler add/drop nodes 11, the loop network architecture of FIG. 1A has the advantages of simplicity, low costs and flexibility. Receivers and transmitters can be easily added or removed at each add/drop node 11. In contrast, for each change of a receiver or transmitter, a network with typical fixed wavelength, add/drop filters must be brought down and the add/drop nodes modified accordingly. However, the network architecture with these coupler add/drop nodes is not without problems; it is costly in terms of optical efficiency. Wavelength capacity is wasted since the same wavelength cannot be reused; each transmitter must use a wavelength which is not used by another transmitter and each receiver must have its own wavelength for individual reception of signals.

FIG. 1B shows the recently proposed architecture of an optical fiber loop network with coupler add/drop nodes 12 to address this problem. The same reference numbers are used for the elements performing the same functions as described with respect to the FIG. 1A network. Each add/drop nodes 12 has couplers for the add and drop functions and a wavelength blocker unit 21 which filters optical signals at selected wavelengths. A wavelength blocker unit has wavelength filters which blocks signals at the filter wavelengths and passes signals at other wavelengths. In each wavelength blocker unit 21 the wavelengths selected for blocking correspond to the wavelengths of the receivers 19 of the add/drop node 12 and optical signals at these selected wavelengths are blocked from traveling from the coupler 13 to the coupler 14 on the loop fiber 10. Signals of the selected wavelengths can be added by the coupler 14. With add/drop nodes 12 on the loop fiber 10, each wavelength channel can be efficiently utilized.

However, wavelength blocker units are expensive and the costs of the loop architecture of FIG. 11B are considerably more than the FIG. 1A network. To a certain extent, the efficiency of the FIG. 1B network negates the attractiveness of low costs and flexibility provided by coupler add/drop node network architecture.

The present invention provides for optical efficiency over the FIG. 1A network architecture but without the high costs and lowered flexibility of FIG. 1B network architecture.

Figure 2:
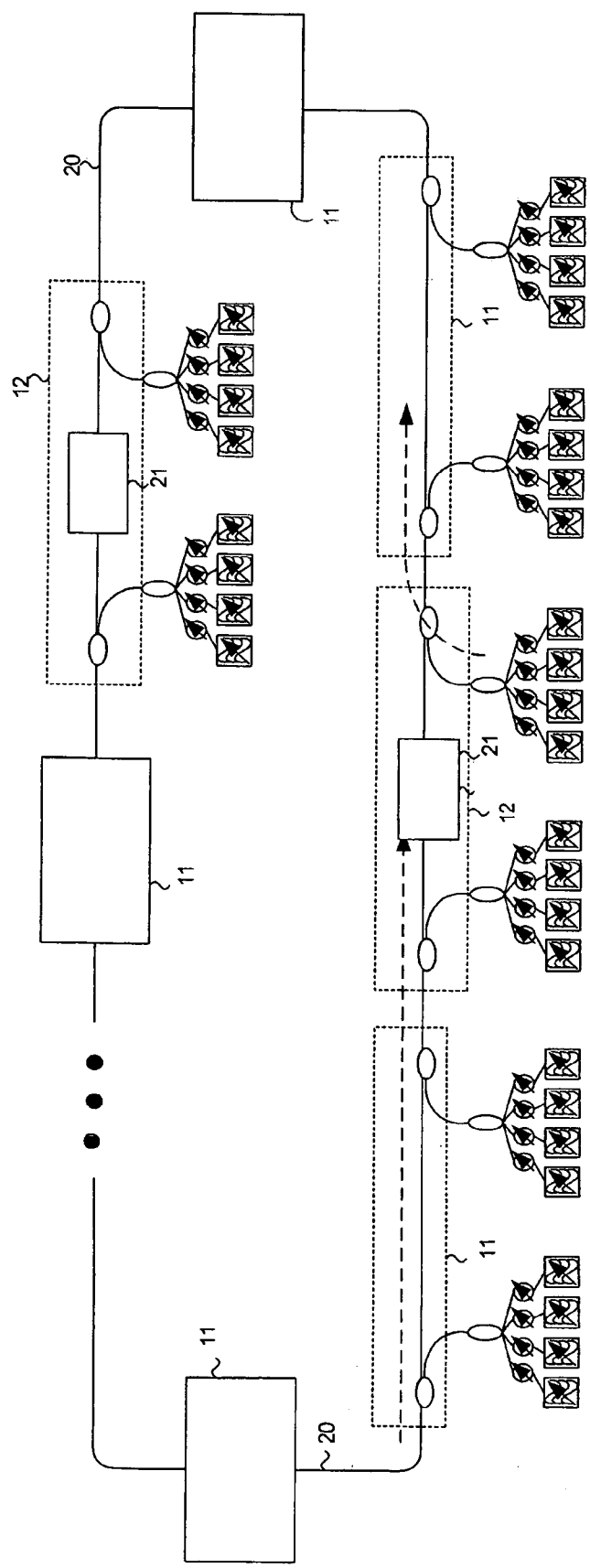
FIG. 2 illustrates the architecture of an optical loop network with mixed coupler add/drop nodes, according to one embodiment of the present invention.

FIG. 2 shows the architecture of a loop network according to one embodiment of the present invention. The architecture has a loop fiber 22 to which are attached a plurality of different add/drop nodes, a mixture of simple add/drop nodes 11, as described with respect to FIG. 1A, and wavelength blocker unit add/drop nodes 12, as described with respect to FIG. 1B. In this network architecture selected wavelengths are blocked along the loop fiber 22 by the periodically spaced wavelength blocker units 21. The distributed wavelength blocker units 21 provide a periodic clean-up of wavelengths so that these wavelength channels may be used again. While there is some inefficiency in wavelength availability as compared to the loop architecture of FIG. 1B, the network architecture of FIG. 2 is much less expensive. The number of wavelength blocker units 21 is reduced with a concomitant decrease in costs. The costs of the wavelength blocker units are, in a sense, amortized over several add/drop nodes of the network.

Figure 3:
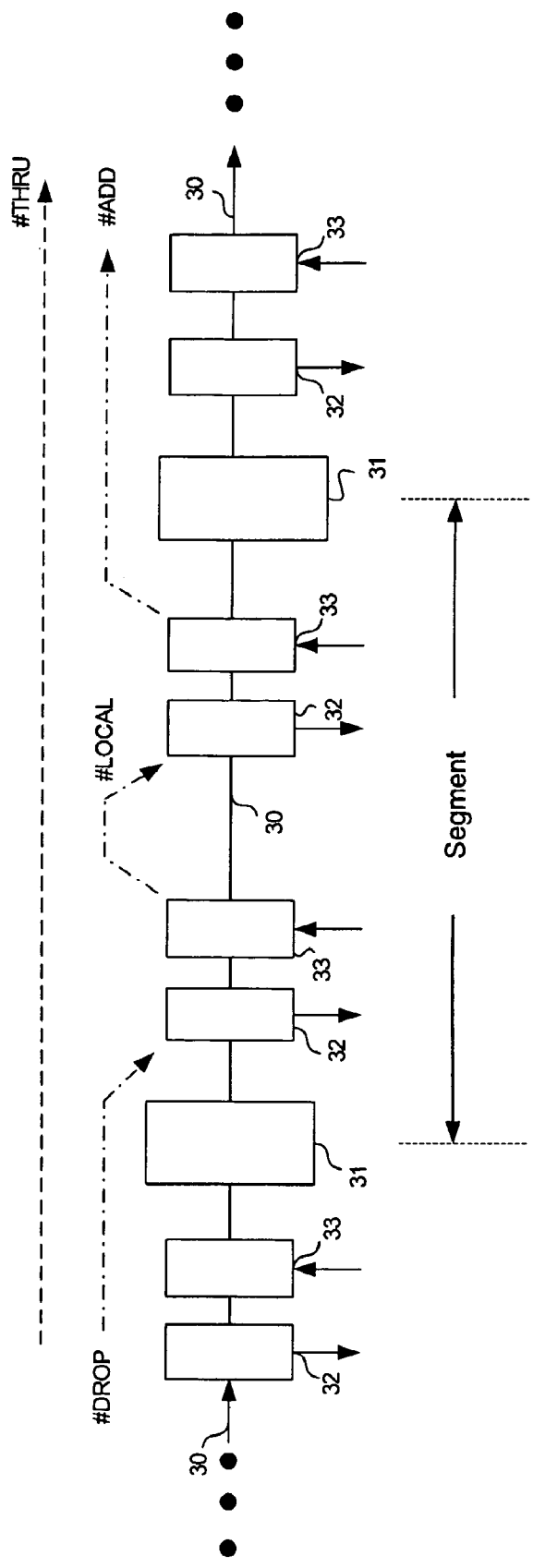
FIG. 3 shows a segment of an optical network with independent wavelength blocker units, according to another embodiment of the present invention.

This decoupling of the wavelength blocker units from the add/drop nodes permits more flexibility in the network design. FIG. 3 helps illustrate a helpful rule in designing networks with distributed wavelength blocker units in accordance with the present invention. In the drawing, a plurality of add/drop nodes 32, or more precisely, add or drop couplers, along an optical fiber loop 30 has wavelength blocker units 31 on either side. Two wavelength blocker units 31 define a segment of the optical loop network. For each such segment, there are a number of wavelength communication channels which are neither added nor dropped in that segment; the signals in these wavelength channels simply pass through the segment. There are also signals in wavelength channels which are dropped, some which are added, and some that are added and dropped within the segment. Those wavelength channels which are added and dropped within the segment provide local channels for the network. The requirement is that the number of through channels, the added channels, the dropped channels, and the local channels should be less than or equal to the total capacity of the loop fiber 30, i.e., the total number of wavelength communication channels which may be carried by the fiber 30. This relationship for each segment can be stated mathematically as:

$$\text{THRU} + \text{ADD} + \text{DROP} + \text{LOCAL} \leq \text{TOTAL};$$

where

THRU is the number of channels passing through the segment; ADD is the number of channels added in the segment; DROP the number of channels dropped in the segment; LOCAL the number of channels which are confined, i.e., added and dropped within the segment; and TOTAL is the total capacity of the loop fiber. In DWDM networks, for example, the total capacity of an optical fiber is typically 32, though some newer DWDM networks reportedly have a capacity of 64 channels. As long as the above relationship is maintained, there can be a proper allocation of wavelength channels. Where there are many users so that the add, drop and local traffic is heavy, wavelength blocker units are distributed to define shorter segments.

Figure 4A:
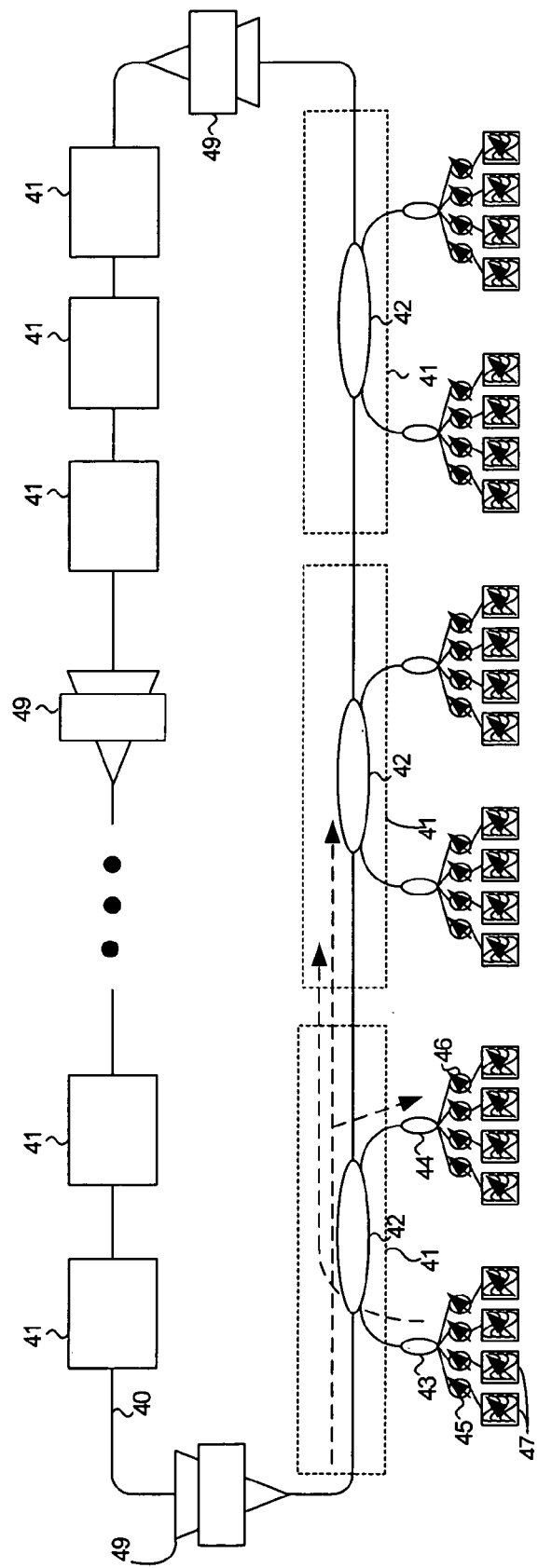
FIG. 4A shows the architecture of an optical loop network with combined optical fiber amplifier/wavelength blocker units.

The wavelength blocker units may distributed along the loop fiber as part of an add/drop node as discussed above, as separate elements, or part of other network elements. FIG. 4A illustrates an optical loop network in which wavelength blocker units are incorporated with optical fiber amplifiers to form combined fiber amplifier/wavelength blocker units 49. Optical fiber amplifiers boost signals to compensate for signal attenuation and losses in the network optical fibers. In the previously described loop networks, the add and drop couplers have insertion losses and in the case of couplers splitting signals, the signals are further weakened by the division of the signals.

Figure 4B:
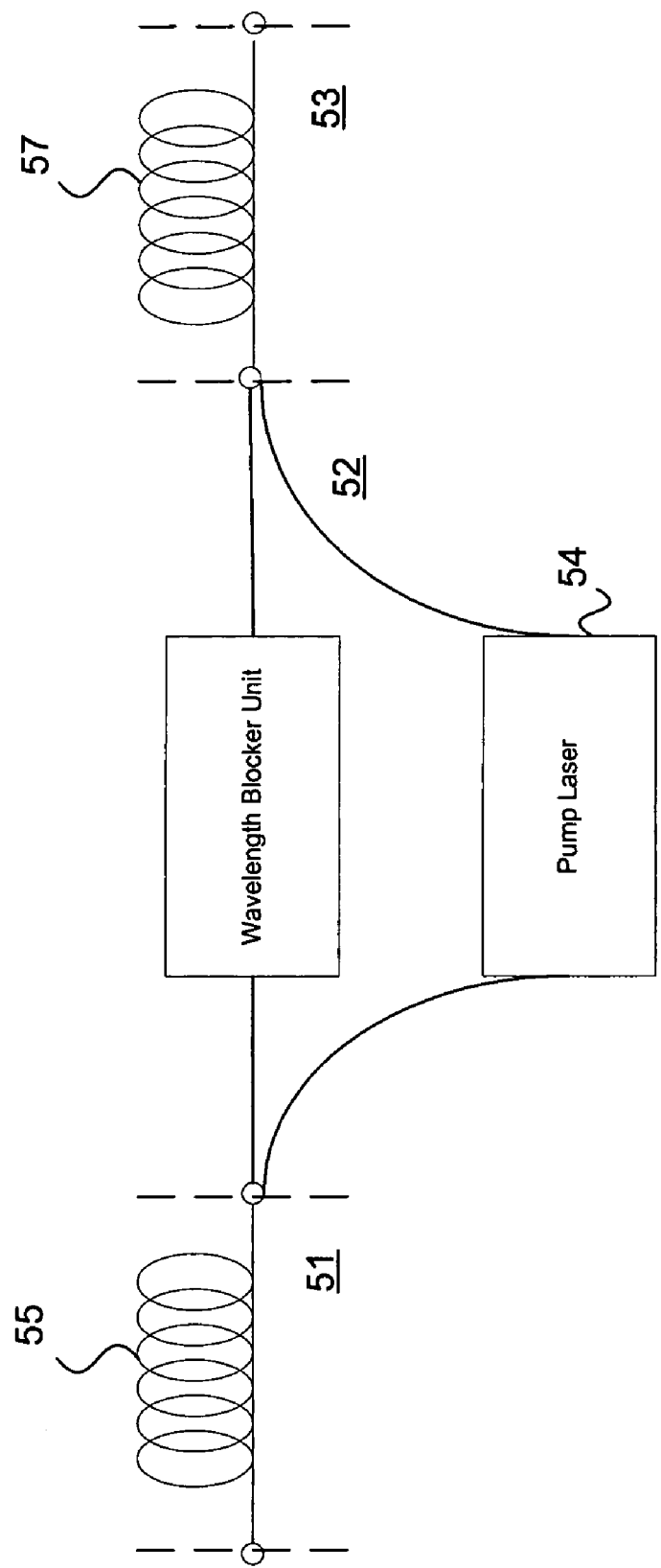
FIG. 4B illustrates the details of a combined optical fiber amplifier/wavelength blocker unit.

FIG. 4B illustrates a combined fiber amplifier/wavelength blocker unit which has a wavelength blocker unit 52 between two optical fiber amplifier stages 51 and 53. Each amplifier stage 51 and 53 is formed by an erbium-doped fiber amplifier (EDFA), or other rare-earth element-doped fiber amplifier, so that each stage 51, 53 is formed by a section 55, 57 of optical fiber which is doped with erbium or other rare earth element. Each stage is energized by one or more pump lasers, typically at a wavelength of 980 nm. FIG. 4B illustrates an arrangement by which a single pump laser 54 energizes both stages 51 and 53. Energized by pump lasers, optical signals at longer wavelengths than 980 nm are amplified as they pass through these energized fiber sections 55 and 57. The wavelength blocker unit 52 can be easily combined with optical amplifier stages because a common optical network combination is a dispersion compensating unit (DCU) between two optical amplifier stages. A DCU is essentially a section of special optical fiber in which the wavelength dependence of velocity of light in conventional optical fibers is reversed so that the DCU cancels the chromatic dispersion of light signals traveling through a conventional optical fiber. In an arrangement such as shown in FIG. 4B, a wavelength blocker unit is substituted for the DCU.

The FIG. 4A arrangement allows optical signals to be amplified as required by placing the combined amplifier/blocker unit 49 in the desired locations. As long as the wavelength restriction described with respect to FIG. 3 is satisfied, there are no problems in the allocation of channels. Of course, each segment is defined by the wavelength blockers in each combined optical amplifier/blocker unit 49.

Another aspect of the network illustrated in FIG. 4A is that the couplers for the add/drop nodes 41 are combined into a single device to provide both add and drop functions. The combined coupler 42 is connected to the optical fiber 40 to provide a through path for signals on the fiber 40. The coupler 42 also provides one optical path for signals split from the optical fiber 40 to a coupler 44 connected to VOAs 46 and receivers 48 and another optical path for signals to be added to the optical fiber 40 from a coupler 43 connected to VOAs 45 and transmitters 47. Besides a simpler construction, the four-way coupler 42 substituted in place of an add coupler and a drop coupler (such as shown in FIGS. 1A and 1B) reduces the through loss, the loss in signal strength incurred by light signals passing through combined coupler 42 or through separate add and drop couplers of an add/drop node. With the combined coupler 42 on the loop fiber 40 the through loss is reduced to 3.5 dB from 6.5 dB, that created by separate add and drop couplers.

While the coupler add/drop network architectures described above are "hitless," i.e., without causing an interruption to network connections, add/drop operations using a parallel splitter for the individual channels, the present invention also provides for an add/drop node in which the drop function is hitless as an additional receiver is added to the network. The add/drop node uses a serial filter cascade, which is typically considered non-hitless based on the typical practice of cascading the serial filters on the main loop.

Figure 5:
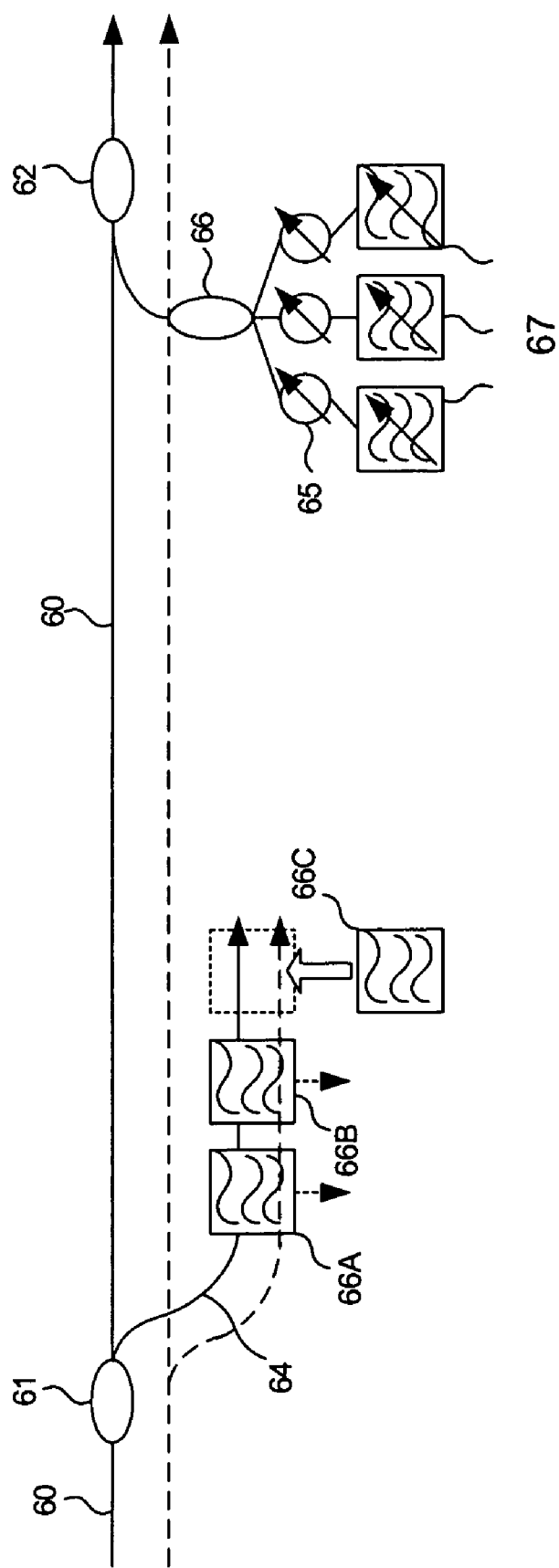
FIG. 5 shows the organization of a non-interrupting drop portion of an add/drop node according to still another embodiment of the present invention.

In accordance with another embodiment of the present invention, FIG. 5 illustrates an add/drop node with a splitting coupler 61 for the drop function and a combining coupler 62 for the add function on an optical fiber 60. The splitting coupler 61 is connected to an optical fiber 64 to which a plurality of filters 66A–66C are serially mounted. Only three wavelength filters are shown for purpose of explanation. The optical filters 66A–66C are inserted in the path of the fiber 64 to select which wavelength channels are to be dropped for a receiver. In accordance with the present invention, as long as the next filter is added at the end of the chain of filters as shown in FIG. 5, no "hit," or interruption, occurs to the receivers already connected to the optical network.

With the proper allocation of wavelengths, a new receiver is simply added to the optical network. The wavelength filters are arranged so that for any pair of filters considered, a wavelength filter which first receives signals from the coupler 61 diverts signals at one or more predetermined wavelengths to its receiver and transmits signals at wavelengths other than the predetermined wavelengths to the second wavelength filter. The second wavelength filter diverts the transmitted signals at at least one or more wavelengths to its receiver. For example, this relationship holds true for the three exemplary filters of FIG. 5. The first filter 66A might be a low-pass filter to divert all signals above a predetermined wavelength $\lambda_1$ to a receiver. The second filter 66B is a low-pass filter to divert signals above a second wavelength $\lambda_2$ longer than $\lambda_1$ and the third filter 66C is a filter to divert signals above a third wavelength $\lambda_3$ longer than $\lambda_2$. Alternatively, the filters 66A–66C can be high-pass filters with a corresponding reversal of relationships among the filters 66A–66C, or bandpass filters with increasingly narrow bands. Special filters are not required; conventional OADM (Optical Add/Drop Multiplexer) filters may be used advantageously.

This arrangement is compatible to system operations since the network never has to be brought down to make these changes. Furthermore, compared to the drop arrangements in the FIGS. 1A and 1B networks, the signal strengths at the receivers in the network of FIG. 5 are higher than those at the receivers of FIGS. 1A and 1B which accept signals which have been split off from the main loop fiber and split again for each receiver. After being split off from the main fiber, the signals to the FIG. 5 receivers, on the other hand, only face the filter losses which are far less than splitting losses.

Hence the present invention provides for a coupler add/drop node in which the drop function is hitless to the receivers of the node. Signal strengths at the receivers are far superior to previous arrangements of coupler add/drop nodes.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

The invention claimed is:

1. An optical network comprising:
   an optical fiber carrying light signals of a plurality of wavelengths, each wavelength defining a communication channel for said optical network;
   a plurality of add couplers connected to said optical fiber, each add coupler inserting light signals of at least one wavelength into said optical fiber;
   a plurality of drop couplers connected to said optical fiber, each drop coupler splitting said light signals of said plurality of wavelengths from said optical fiber; and a plurality of wavelength blocker units connected to said optical fiber, each wavelength blocker unit filtering out optical signals at selected wavelengths on said optical fiber and distributed among groups of said pluralities of add and drop couplers so that each segment of said optical fiber between pairs of neighboring wavelength blocker units has at least three add and drop couplers.

2. The optical network of claim 1 wherein each segment has the following relationship:

THRU+ADD+DROP+LOCAL≤TOTAL holds true, where THRU is the number of channels passing through said segment; ADD is the number of channels added within said segment; DROP the number of channels dropped within said segment; LOCAL the number of channels confined within said segment; and TOTAL is the total capacity of said optical fiber.

3. The optical network of claim 2 wherein said pluralities of add and drop couplers are organized into a plurality of add/drop nodes, each add/drop node having an add coupler and a drop coupler, said plurality of add/drop nodes further comprising a first set of add/drop nodes, each first set add/drop node further including a wavelength blocker unit, and a second set of add/drop nodes, each second set add/node node having no wavelength blocker unit.

4. The optical network of claim 1 further comprising a plurality of optical amplifiers connected to and distributed along said optical fiber, and wherein said wavelength blocker units are combined with said optical amplifiers.

5. The optical network of claim 4 wherein a combination of wavelength blocker units and optical amplifiers comprises:
   a first optical amplifier stage having an input terminal for connection to said optical fiber and an output terminal;
   a second optical amplifier stage having an input terminal and an output terminal connected to said optical fiber; and
   a wavelength blocker unit connected to said output terminal of said first amplifier stage and said input terminal of said second amplifier stage.

6. The optical network of claim 1 wherein at least one of said plurality of add couplers and at least one of said plurality of drop couplers are combined in a single device having four terminals, first and second terminals connected to said optical fiber to provide an optical path therethrough, a third terminal for an optical path for signals split from said optical fiber, and a fourth terminal for an optical path for signals to be added to said optical fiber.

7. The optical network of claim 6 wherein said third terminal is connected to a plurality of wavelength filters connected in a serial cascade arranged so that for any pair of wavelength filters, a wavelength filter first receiving signals from said single device diverts signals at one or more predetermined wavelengths to a first receiver and transmits signals at wavelengths other than said one or more predetermined wavelengths to a second wavelength filter, said second wavelength filter diverting said transmitted signals at at least one or more wavelengths to a second receiver.

8. The optical network of claim 1 wherein at least one drop coupler is connected to a plurality of wavelength filters connected in a serial cascade arranged so that for any pair of wavelength filters, a wavelength filter first receiving signals from said drop coupler diverts signals at one or more predetermined wavelengths to a first receiver and transmits signals at wavelengths other than said one or more predetermined wavelengths to a second wavelength receiver, said second wavelength receiver diverting said transmitted signals at at least one or more wavelengths to a second receiver.

9. The optical network of claim 8 wherein said wavelength filters comprise low-pass filters.

10. The optical network of claim 8 wherein said wavelength filters comprise high-pass filters.

11. The optical network of claim 8 wherein said wavelength filters comprise bandpass filters.

12. For an optical network having an optical fiber carrying signals of a plurality of wavelengths, each wavelength defining a communication channel for said optical network, a combination comprising:
   a first optical amplifier stage having an input terminal for connection to said optical fiber and an output terminal;
   a second optical amplifier stage having an input terminal and an output terminal connected to said optical fiber;
   a wavelength blocker unit connected to said output terminal of said first amplifier stage and said input terminal of said second amplifier stage, said wavelength blocker unit preventing signals of one or more predetermined wavelengths from passing from said first optical amplifier input terminal to said second optical amplifier output terminal; and
   a pump connected to said first and second optical amplifier stages;
   whereby signals not of said one or more predetermined wavelengths are amplified in said optical fiber and signals of said one or more predetermined wavelengths are blocked.

* * * * *